United States Patent

Hashimoto et al.

[11] Patent Number: 6,109,299
[45] Date of Patent: Aug. 29, 2000

[54] CHAMBER STRUCTURE

[75] Inventors: Takashi Hashimoto; Masami Honma; Toshihide Kimisawa, all of Kanagawa-ken, Japan

[73] Assignees: Nissan Motor Co., Ltd.; Nifco Inc., both of Kanagawa-ken, Japan

[21] Appl. No.: 09/198,351

[22] Filed: Nov. 24, 1998

[30] Foreign Application Priority Data

Nov. 25, 1997 [JP] Japan .................................. 9-323294

[51] Int. Cl.$^7$ ............................ B60K 15/06; F02M 37/14
[52] U.S. Cl. ........................... 137/574; 137/576; 123/514
[58] Field of Search .................................. 137/571, 574, 137/576; 123/514, 516

[56] References Cited

U.S. PATENT DOCUMENTS

| | | | |
|---|---|---|---|
| 4,503,885 | 3/1985 | Hall .......................................... | 137/574 |
| 4,842,006 | 6/1989 | Scheurenbrand et al. .......... | 137/574 X |
| 4,886,031 | 12/1989 | Scheurenbrand et al. .............. | 123/516 |
| 4,899,784 | 2/1990 | Woodgate et al. ...................... | 137/574 |
| 5,029,611 | 7/1991 | Sasaki ..................................... | 137/574 |
| 5,070,849 | 12/1991 | Rich et al. ........................... | 123/514 X |
| 5,111,844 | 5/1992 | Emmert et al. ..................... | 137/574 X |
| 5,341,842 | 8/1994 | Chih et al. ................................ | 137/574 |
| 5,396,872 | 3/1995 | Ruger et al. ............................. | 123/514 |
| 5,941,279 | 8/1999 | Frank et al. ............................. | 137/574 |

FOREIGN PATENT DOCUMENTS 6-83441 11/1994 Japan .

Primary Examiner—John Rivell
Attorney, Agent, or Firm—McDermott, Will & Emery

[57] ABSTRACT

A chamber structure is provided which is able to flow down fuel smoothly at a desired flow rate. A chamber main body is fixed onto an inner bottom 1a of a fuel tank of a vehicle, and a suction port of a fuel pump is inserted into an inside of the chamber main body. A through hole is formed in a peripheral wall of the chamber main body. A fuel tank side through hole for connecting an inside of the fuel tank and a negative pressure chamber being connected to the first through hole is arranged in a vicinity of the inner bottom of the fuel tank. An inlet port for passing return fuel into the inside of the fuel tank is faced to the negative pressure chamber. A recirculation funnel which has an upper end opening directed to the inside of the chamber main body at a position lower than an upper edge of the chamber main body is formed to extend upward from the negative pressure chamber.

A peripheral length of the upper end opening of the recirculation funnel is set longer than that of the lower edge opening of the recirculation funnel directed to the negative pressure chamber.

10 Claims, 7 Drawing Sheets

CHAMBER STRUCTURE

The contents of Application No. TOKUGANHEI 9-323294, filed on Nov. 25, 1997 in Japan is hereby incorporated by reference.

BACKGROUND OF THE INVENTION

1. Field of the Invention

The present invention relates to a chamber structure which is arranged in a fuel tank of a vehicle and can keep suction of fuel in response to change in fuel level.

2. Description of the Related Art

As the chamber structure of the vehicle of this type in the related art, the chamber structure set forth in Utility Model Application Publication (KOKAI) Hei 6-83441, for example, etc. have been known.

A chamber is secured to a bottom portion of a fuel tank main body which stores fuel of the vehicle.

A suction opening of a feed pump as the fuel pump is inserted into a chamber body. A through hole for sending out fuel into the a chamber main body is formed in a peripheral wall portion of the chamber main body.

An ejector portion as a negative pressure area is provided in front of the through hole.

An inlet port of a return pipe for supplying the return fuel to the chamber an body is arranged in the ejector portion.

In addition, a recirculation pipe having an upper opening which is arranged below an upper edge of the chamber main body and is directed to the chamber main body and a lower opening which is directed to the ejector portion is provided upward from the ejector portion.

In the chamber structure in the related art, because of an exhaust pressure of the return fuel which is returned by the return pipe, a negative pressure is generated in a clearance portion between the inlet portion and the through hole.

Therefore, residual fuel in the fuel tank which enters from the fuel tank main body to the ejector portion is involved into the return fuel, and then such residual fuel as well as the return fuel is sent out into the chamber main body.

Accordingly, fuel in the chamber mean body can be sucked out stably by the feed pump.

Also, fuel can be flown down from an upper opening of a recirculation pipe into the ejector portion via the recirculation pipe before fuel is flown out from the chamber main body to the fuel tank main body because of an increase in the fuel level in the chamber main body, so that fuel having a relatively high temperature in the chamber main body can be recirculated.

As a result, a higher temperature of fuel in the fuel tank main body in the outside of the chamber can be prevented to thus suppress generation of vapors, and also the temperature of fuel which is sucked and sent out from the fuel pump suction port can be brought close to the temperature of the return fuel.

In addition, since the ejector portion is filled with the tank residual fuel and fuel in the chamber main body, which is flown down via the recirculation pipe, involvement of the air can be prevented.

SUMMARY OF THE INVENTION

However, in such chamber structure, an amount of flow down of fuel which exceeds an upper end surface of an upper opening is limited to a predetermined amount which is derived by multiplying a peripheral length of the upper opening by a height of the upper opening from the upper end surface.

Since the height of fuel which exceeds the upper opening depends on viscosity of fuel, such height is scarcely changed by the shape of the upper opening. For this reason, in the conventional upper opening in which an amount of flow-down depends on the peripheral length of the upper opening and which has a tubular structure and has a length being substantially equal to the peripheral length of the lower opening of the recirculation funnel portion, there has been such a problem that it is difficult to flow down fuel smoothly at a desired flow rate.

Therefore, it is an object of the present invention to provide a chamber structure which is able to flow down fuel smoothly at a desired flow rate.

In order to achieve the above object, according to a first aspect of the present invention, there is provided a chamber structure comprising a chamber main body arranged on an inner bottom of a fuel tank of a vehicle, a suction port of a fuel pump being inserted into an inside of the chamber main body; a first through hole formed in a peripheral wall of the chamber main body; a negative pressure chamber connected to the first through hole: a second through hole for connecting an inside of the fuel tank and the negative pressure chamber, the second through hole being arranged in a vicinity of the inner bottom of the fuel tank; an inlet port for passing return fuel into the inside of the chamber main body via the first through hole; and a recirculation funnel formed to extend upward from the negative pressure chamber, the recirculation funnel having an upper end opening directed to the inside of the chamber main body and a lower end opening directed to the negative pressure chamber, the upper end opening being positioned lower than an upper edge of the chamber main body, and a peripheral edge of the upper end opening being formed longer than that of the lower edge opening.

According to the first aspect, since a peripheral length of the upper end opening of the recirculation funnel is set longer than that of the lower end opening of the recirculation funnel, a flow rate of fuel can be increased rather than the conventional case where the chamber structure includes the upper end opening whose length is substantially identical to the peripheral length of the lower end opening of the recirculation funnel. As a result, fuel can flow down smoothly at a desired flow rate.

In the chamber structure according to the second aspect of the present invention, the recirculation funnel has a stepped portion for connecting an inner area of an upper end opening side to an inner area of a lower end opening side.

According to the second aspect, the fuel flowing in from the upper end opening of the recirculation funnel can stagnate once at the stepped portion. Therefore, the recirculation funnel can always be filled with the flow-down fuel, so that a possibility to involve the air into fuel can be reduced.

In the chamber structure according to the third aspect of the present invention, the stepped portion is arranged in a vicinity of the lower end opening.

According to the third aspect, since the stepped portion is formed in the neighborhood of the lower end opening, fuel being stagnated by the stepped portion can be sucked out by the negative pressure in the negative pressure chamber. Therefore, fuel can flow down more smoothly at a desired flow rate.

In the chamber structure according to the fourth aspect of the present invention, the stepped portion has an inclined surface which is narrowed from the upper end opening side toward the lower end opening side.

According to the fourth aspect, since the inclined surface being formed on the stepped portion has a sectional shape which is narrowed from the upper end opening side toward the lower end opening side, fuel can flow down along the inclined surface and then flow smoothly into the negative pressure chamber.

In the chamber structure according to the fifth aspect of the present invention, the stepped portion and the peripheral edge of the upper end opening are formed integrally with each other and are attached detachably to the negative pressure chamber, and the stepped portion has a funnel shape which is tapered while reducing its diameter from the upper end opening side toward the lower end opening side.

According to the fifth aspect, since the peripheral portion of the upper end opening of the recirculation funnel is formed integrally with the stepped portion and is attached detachably to the negative pressure chamber, a margin for formation of the upper end opening can be increased regardless of the location of the negative pressure chamber.

Therefore, the peripheral length of the upper end opening of the recirculation funnel can be set longer that of the lower end opening of the recirculation funnel in the negative pressure chamber.

In the chamber structure according to the sixth aspect of the present invention, the inclined surface has a guide portion for regulating a flow of fuel in a spiral fashion.

According to the sixth aspect, fuel can be regulated in a spiral fashion by the guide portions formed on the inclined surface. Therefore, fuel can be made to flow into the negative pressure chamber more smoothly.

DESCRIPTION OF THE PREFERRED EMBODIMENT

Chamber structures according to embodiments of the present invention will be explained in detail with reference to the accompanying drawings hereinafter.

(First Embodiment)

A chamber structure according to a first embodiment of the present invention will be explained with reference to FIGS. 1 and 2 hereinbelow.

Figure 1:
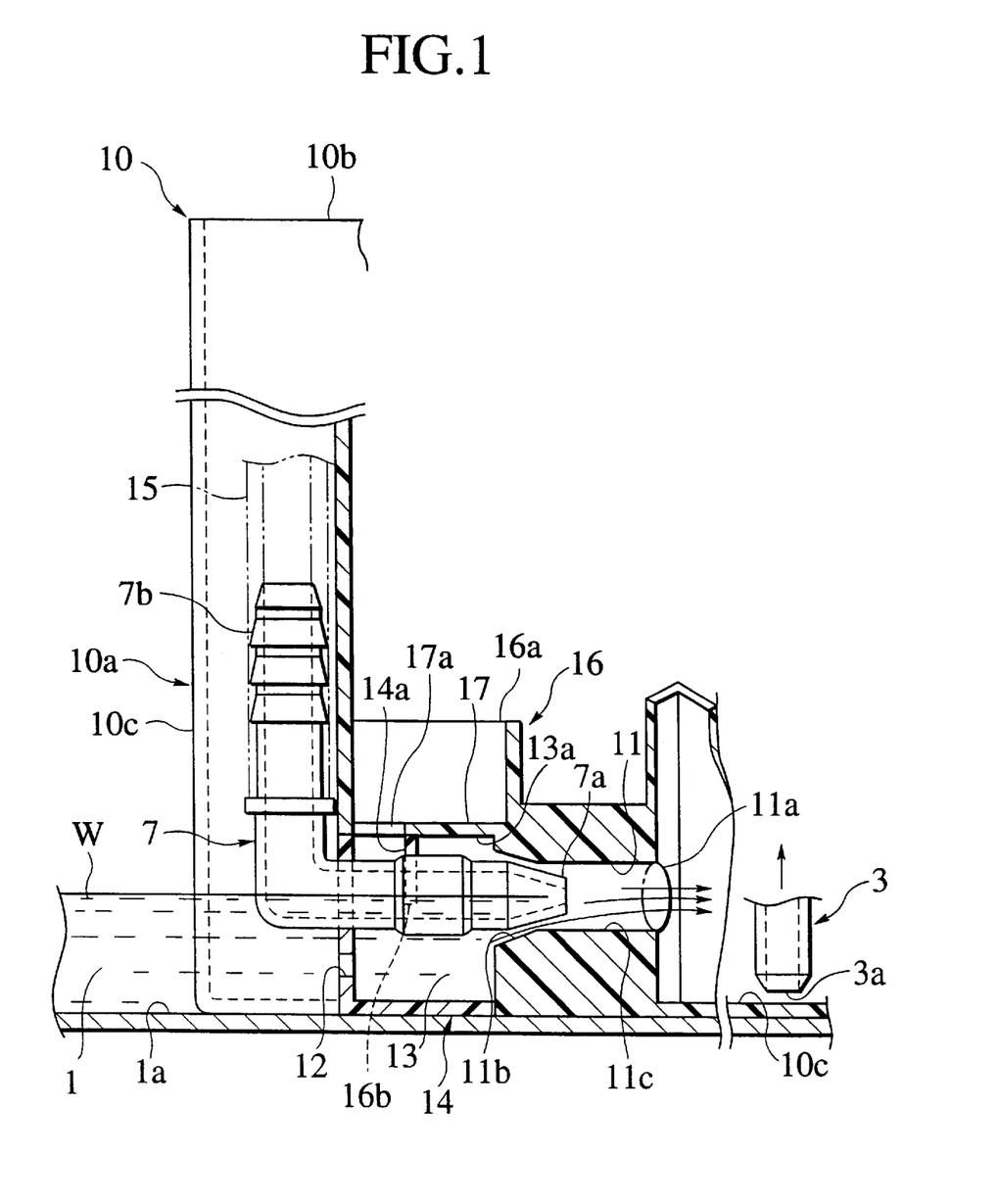
FIG. 1 is a sectional view, taken along a line I—I in FIG. 2, showing a configuration of the pertinent portion of a chamber structure according to a first embodiment of the present invention.
Figure 2:
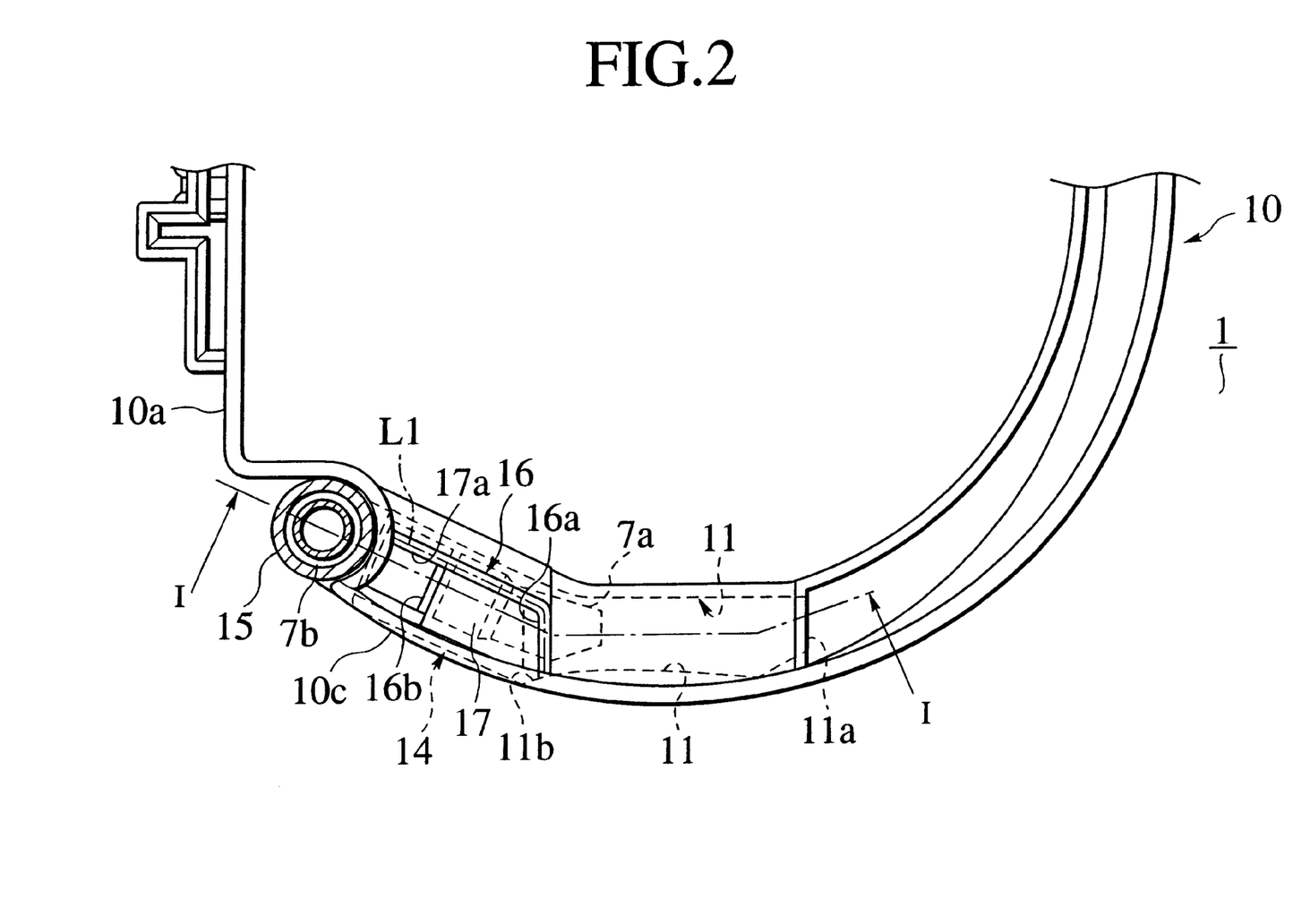
FIG. 2 is a top view showing the configuration of the pertinent portion of the chamber structure according to the first embodiment of the present invention.

FIGS. 1 and 2 show the pertinent portion of the chamber structure according to the first embodiment of the present invention.

To begin with, a configuration of the chamber structure will be explained. In the chamber structure according to the first embodiment, a chamber 10 is secured to a bottom portion 1a of a fuel tank main body 1 which stores fuel of the vehicle. A suction port 3a of a fuel pump 3 is inserted into a chamber main body 10a of the chamber 10. The chamber main body 10a is formed as a substantially circular cylinder which has one closed end and one open end. Fuel in the chamber main body 10a can be sucked out by the fuel pump 3.

A through hole 11 through which fuel is supplied to the chamber main body 10a is formed near a lower edge of a peripheral wall 10c of the chamber main body 10a. The through hole 11 has a chamber side port 11a which is formed to direct to the chamber main body 10a, a negative pressure chamber side port 11b which is formed to direct to a negative pressure chamber 13, and a cylinder portion 11c which connects the chamber side port 11a and the negative pressure chamber side port 11b. The negative pressure chamber side port 11b has a larger diameter than that of the chamber side port 11a and is formed as a taper shape.

An inlet port adapter 14 is fitted onto a peripheral wall of the chamber main body 10a. A return tube 7 is formed integrally with the inlet port adapter 14 from the outside of the through hole 11. The negative pressure chamber 13 is defined by the inlet port adapter 14 and the peripheral wall of the chamber main body 10a.

In the state that the inlet port adapter 14 is fitted, an inlet port 7a formed at a top end of the return tube 7 is inserted into the through hole 11. A fuel tank side through hole 12 which is connected to the fuel tank main body 1 is formed on a wall surface of the negative pressure chamber 13, which opposes to the through hole 11, in the neighborhood of the bottom portion 1a of the fuel tank main body 1.

A return tube 15 is connected to an inlet port 7b formed at another top end of the return tube 7. The return fuel which is returned into the fuel tank can be discharged via the inlet port 7a of the return tube 7.

A recirculation funnel 16 is provided upward from the negative pressure chamber 13. The recirculation funnel 16 has an upper end opening 16a which is positioned lower than an upper edge of the chamber main body 10a and is directed to the inside of the chamber main body 10a. The recirculation funnel 16 has a lower end opening 16b which is inserted into the negative pressure chamber 13. The lower end opening 16b is provided integrally with the inlet port adapter 14.

Out of a peripheral length of the upper end opening 16a which is opened upward in the substantially vertical direction, as indicated by a dot-dash line in FIG. 2, a length L1 of a portion, which fuel overflows from the inside of the chamber main body 10a to the recirculation funnel 16, is set longer than the peripheral length of the lower end opening 16b which is opened downward in the substantially vertical direction (the length L1 of the portion which fuel overflows is longer to the peripheral length of the upper and opening of the recirculation pipe in the related art). A passage sectional area of the recirculation funnel 16 is set larger than that of the fuel tank side through hole 12.

A horizontal bulkhead portion 17 is formed in the passage of the recirculation funnel 16 as a stepped portion so as to connect the upper end opening side and the lower end opening side of the recirculation funnel 16.

The horizontal bulkhead portion 17 is formed integrally on the chamber main body 10a side to be positioned in the vicinity of the lower end opening 16b. The horizontal bulkhead portion 17 is employed in common as an upper wall 13a of the negative pressure chamber 13.

An inlet port 17a is formed in the horizontal bulkhead portion 17. The inlet port 17a is positioned at a substantial identical height to oppose to the lower end opening 16b in the state that the inlet port adapter 14 is fitted onto the peripheral wall of the chamber main body 10a. The inlet port 17a has the substantially same size as the lower end opening 16b.

The lower end opening 16b is fanned at a lower end of a vertical passage 14a which is formed integrally with the inlet port adapter 14. The lower end opening 16b is formed to extend downward in the negative pressure chamber 13 up to a height near the fuel tank side through hole 12. Also, the lower end opening 16b is positioned at a height between a passage center of the fuel tank side through hole 12 and a passage center of the chamber side port 11a of the through hole 11.

Next, an operation of the chamber structure according to the first embodiment will be explained hereinbelow.

Fuel to be returned to the fuel tank 1 is discharged at a predetermined pressure from the inlet port 7a toward the through hole 11. As a result, a negative pressure is generated in a clearance formed between the inlet port 7a and the taper-shaped negative pressure chamber side port 11b.

Therefore, fuel is introduced from the fuel tank 1 into the negative pressure chamber 13 via the fuel tank side through hole 12. Then, the fuel is sent out from the negative pressure chamber 13 into the chamber main body 10a via the negative pressure chamber side port 11b, the cylinder portion 11c, and the chamber side port 11a such that such fuel is involved into fuel being charged from the inlet port 7a.

In contrast, because of an increase in level of fuel in the chamber main body 10a, fuel overflows an upper edge 10b into the fuel tank main body 1. First, such fuel flows down from the upper end opening 16a of the recirculation funnel 16 into the recirculation funnel 16. Then, the fuel flows down from the lower end opening 16b formed on the horizontal bulkhead portion 17 into the negative pressure chamber 13 via the lower end opening 16b formed on the inlet port adapter 14 side, so that the fuel can be recirculated.

Since the length L1 of the peripheral portion, which the fuel overflows from the inside of the chamber main body 10a into the recirculation funnel 16, out of the peripheral length of the upper end opening 16a of the recirculation funnel 16 is set longer than the peripheral length of the lower end opening 16b of the recirculation funnel 16 in the negative pressure chamber 13, an amount of the flow down fuel can be increased rather than the conventional case where the chamber structure includes the upper end opening whose length is substantially identical to the peripheral length of the lower end opening of the recirculation funnel. As a result, the fuel can flow down smoothly at a desired flow rate (the peripheral length L1 of the upper end opening 16a×the height h exceeding the upper end opening 16a).

In addition, the upper end opening 16a side of the recirculation funnel 16 and the lower end opening 16b side in the negative pressure chamber 13 are connected via the horizontal bulkhead portion 17 formed in the passage of the recirculation funnel 16. Therefore, the fuel which flows in from the upper and opening side of the recirculation funnel 16 stagnates once at the horizontal bulkhead portion 17. The relatively narrow vertical passage 14a in the recirculation funnel 16, which is provided from the inlet port 17a to the lower end opening 16b, is always filled with the flow down fuel, so that a possibility to involve the air can be reduced further.

Moreover, since the horizontal bulkhead portion 17 is formed in the neighborhood of the lower end opening 16b, the fuel being stagnated by the horizontal bulkhead portion 17 can be sucked out by the negative pressure in the negative pressure chamber 13 and therefore the fuel can flow down more smoothly at a desired flow rate.

Furthermore, the lower end opening 16b of the recirculation funnel 16 is provided to extend downward into the negative pressure chamber 13 up to the level close to the fuel tank side through hole 12. Therefore, even if the level w of fuel is lowered until a predetermined height, such a possibility can be reduced that the air is drawn into from the lower end opening 16b of the recirculation funnel 16 because the lower end opening 16b is immersed in fuel.

Accordingly, the negative pressure which is generated by introducing the return fuel, being returned into the fuel tank main body 1, into the inlet port 7a never escapes from the negative pressure chamber 13. Therefore, fuel in the fuel tank main body 1 can be sent out from the negative pressure chamber 13 into the chamber main body 10a via the chamber side port 11a.

Hence, the residual fuel in the fuel tank main body 1 can be introduced into the chamber main body 10a, and then suction of fuel can be carried out from the suction port 3a of the fuel pump 3 facing to the chamber main body 10a. Supply of fuel into the chamber main body 10a is continued until the level w of fuel in the negative pressure chamber 13 is reduced up to the substantially same height as the position of the fuel tank side through hole 12.

Besides, the lower end opening 16b of the recirculation funnel 16 is set at a height between the passage center of the fuel tank side through hole 12 and the passage center of the chamber side port 11a of the through hole 11. Therefore, first the fuel being recirculated from the chamber main body 10a flows preferentially into the negative pressure chamber 13 via the recirculation funnel 16, and then such fuel as well as the return fuel which is send from the inlet port 7a with pressure is supplied into the chamber main body 10a.

Consequently, the fuel having a relatively high temperature is sucked up from the suction port 3a of the fuel pump 3 and then sent out toward the engine. Therefore, generation of the vapor can be suppressed by preventing the high temperature of the fuel in the fuel tank main body 1. Also, a temperature of the fuel which is sucked out from the suction port 3a of the fuel pump 3 and then send out can be brought close to that of the return fuel, so that an increase in temperature of the entire fuel tank unit side can be suppressed.

(Second Embodiment)

Figure 3:
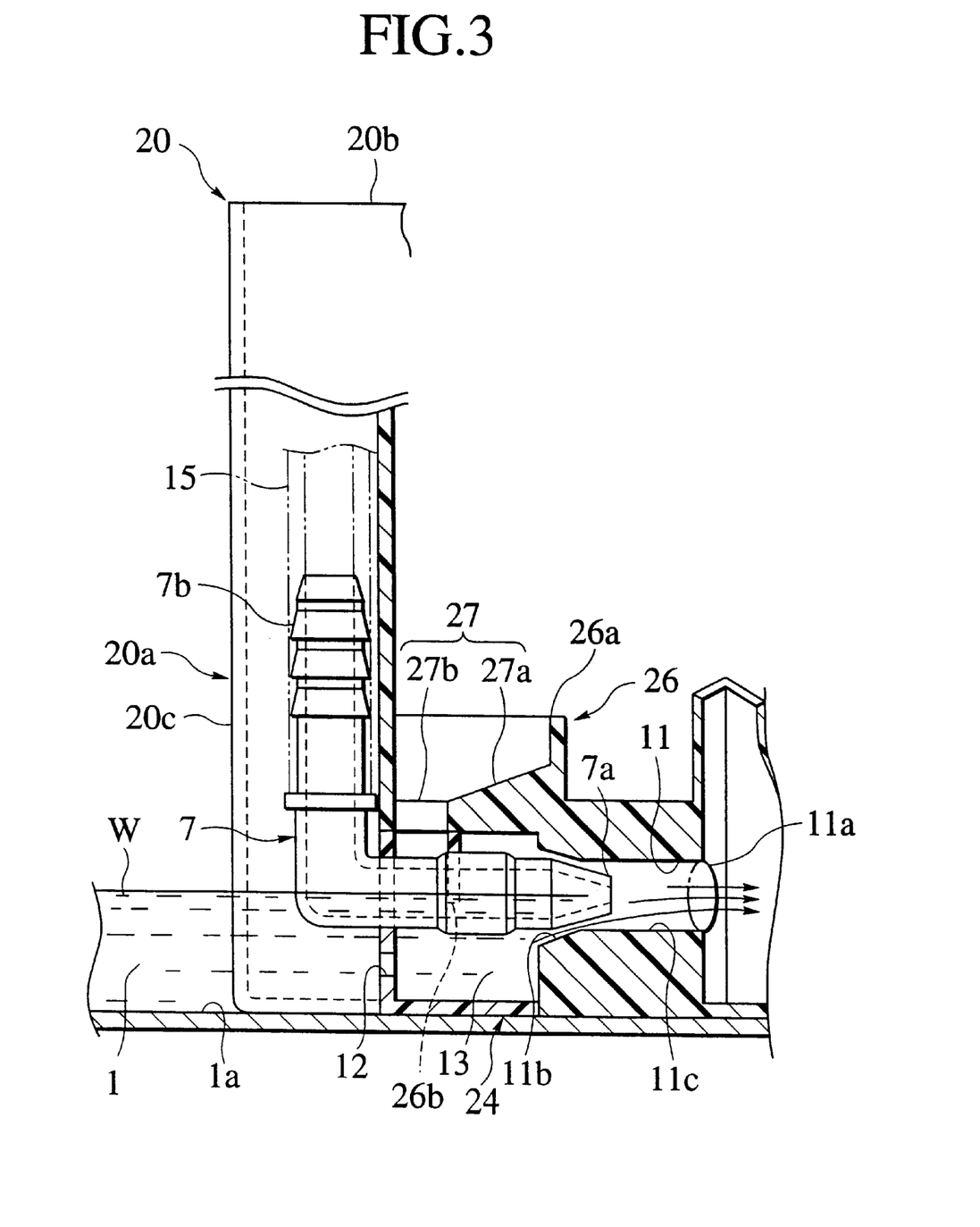
FIG. 3 is a sectional view showing a portion which corresponds to the configuration shown in the FIG. 1, in a chamber structure according to a second embodiment of the present invention.

FIG. 3 shows the pertinent portion of a chamber structure according to a second embodiment of the present invention.

Same references are labeled to same or similar elements to those in the above first embodiment, and then explanation will be made hereinbelow.

First, explanation as for differences in configuration between the second embodiment and the first embodiment will be made mainly. In place of the horizontal bulkhead portion 17 as the stepped portion, an inclined bulkhead portion 27 is formed in a recirculation funnel 26 of a chamber 20. The inclined bulkhead portion 27 has an inclined surface 27a which is narrowed in sectional shape from an upper end opening 26a side to a lower end opening 26b side.

An inlet port 27b is formed in the inclined bulkhead portion 27. The inlet port 27b is positioned at a substantial identical height to oppose to the lower end opening 26b in the stare that an inlet por adapter 24 is fitted onto the peripheral wall of the chamber main body 10a. The inlet port 27b has the substantially same size as the lower end opening 26b. The inlet port adapter 24 is formed to have the substantially same shape as the above inlet port adapter 14.

Next, an operation of the chamber structure according to the second embodiment will be explained hereinbelow.

Since the inclined surface 27a being formed on the inclined bulkhead portion 27 has a sectional shape which is narrowed from the upper end opening 26a side toward the lower end opening 26b side, the fuel can flow down along the inclined surface 27a and then flow smoothly into the negative pressure chamber 13.

(Third Embodiment)

Figure 4:
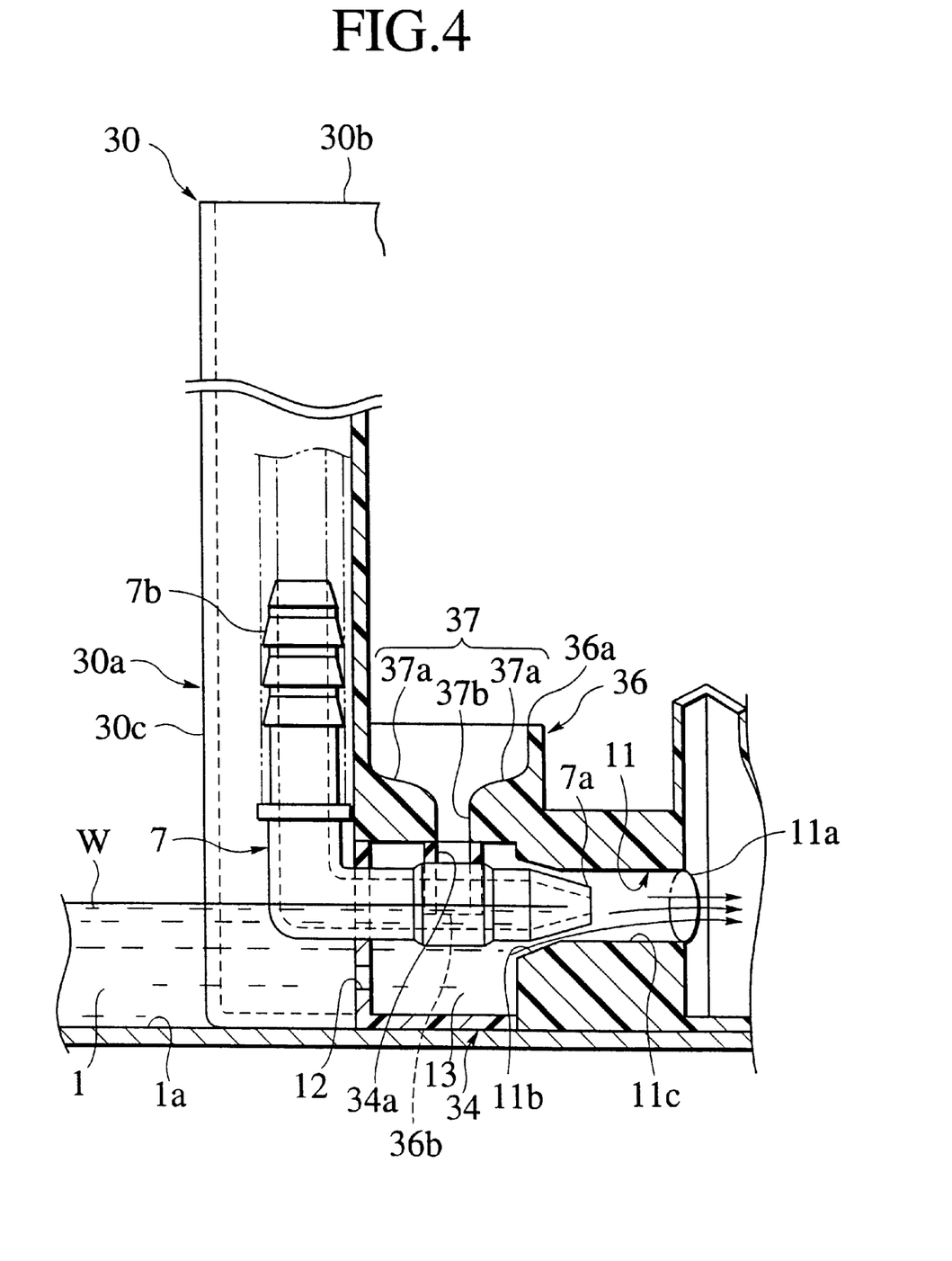
FIG. 4 is a sectional view showing a portion which corresponds to the configuration shown in the FIG. 1, in a chamber structure according to a third embodiment of the present invention.

FIG. 4 shows the pertinent portion of a chamber structure according to a third embodiment of the present invention.

Same references are labeled to same or similar elements to those in the above first and second embodiments, and then explanation will be made hereinbelow.

An inclined bulkhead portion 37 as the stepped portion is provided in a recirculation funnel 36 of a chamber 30. Inclined surfaces 37a, 37a are formed in the inclined bulkhead portion 37 almost symmetrically with respect to an inlet port 37b. The inclined surfaces 37a, 37a are narrowed in sectional shape from an upper end opening 36a side to a lower end opening 36b side respectively.

The lower end opening 36b is formed at a lower end of a vertical cylindrical passage 34a at an almost center location of an inlet port adapter 34 which has the return tube 7, lie the inlet port adapter 14, etc.

The vertical cylindrical passage 34a has the substantially same passage sectional area as that of the inlet port 37b. The vertical cylindrical passage 34a is formed at the substantially same position so as to oppose to the inlet part 37b in the state that the inlet port adapter 34 is fitted.

Next, an operation of the chamber structure according to the third embodiment will be explained hereinbelow.

Since the inclined surfaces 37a, 37a being formed on the inclined bulkhead portion 37 have a sectional shape which is narrowed from the upper end opening 36a side toward the lower end opening 36b side respectively, the fuel can flow down along the inclined surfaces 37a, 37a and then flow smoothly into the negative pressure chamber 13.

(Fourth Embodiment)

Figure 5:
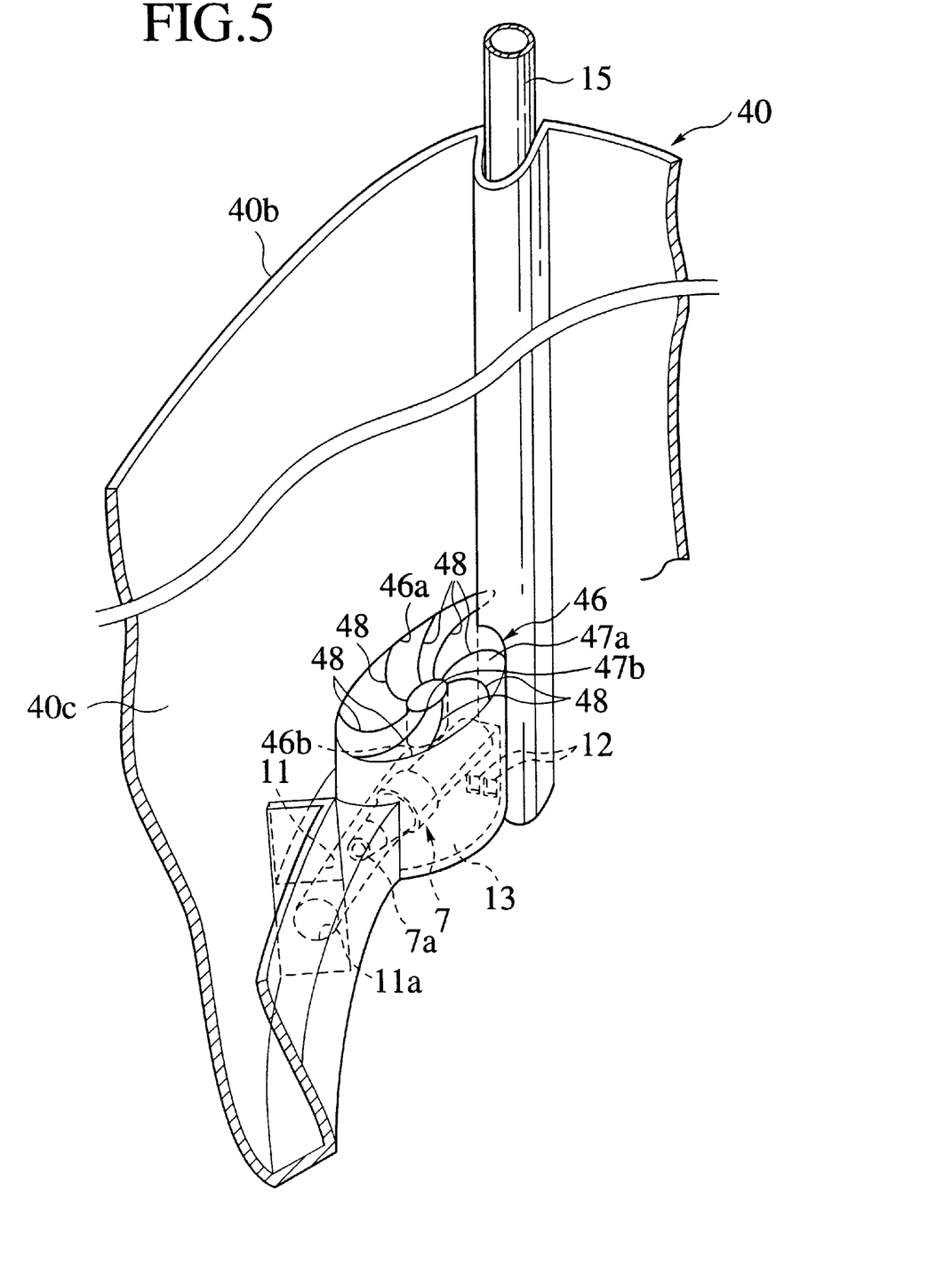
FIG. 5 is a perspective view showing the pertinent portion of a chamber structure according to a fourth embodiment of the present invention, when viewed from the inside of the chamber main body.

FIG. 5 shows the pertinent portion of a chamber structure according to a fourth embodiment of the present invention.

Same references are labeled to same or similar elements to those in the above first to third embodiments, and then explanation will be made hereinbelow.

An inclined bulkhead portion 47 as the stepped portion is provided in a recirculation funnel 47 of a chamber 40. An inclined surface 47a is formed on the inclined bulkhead portion 47 to form a substantially circular cone shape almost symmetrically with respect to an inlet port 47b. The inclined surface 47a is narrowed in sectional shape from an upper end opening 46a side to a lower end opening 46b side.

A plurality of guide grooves 48, 48, . . . which regulate flow of the fuel to form a spiral shape respectively are formed on the inclined surface 47a.

Next, an operation of the chamber structure according to the fourth embodiment will be explained hereinbelow.

The fuel, when flows down, is regulated by the plurality of guide grooves 48, 48, . . . formed on the inclined surface 47a so as to form a spiral shape.

Therefore, the fuel can be made to flow into the negative pressure chamber 13 more smoothly.

(Fifth Embodiment)

Figure 6:
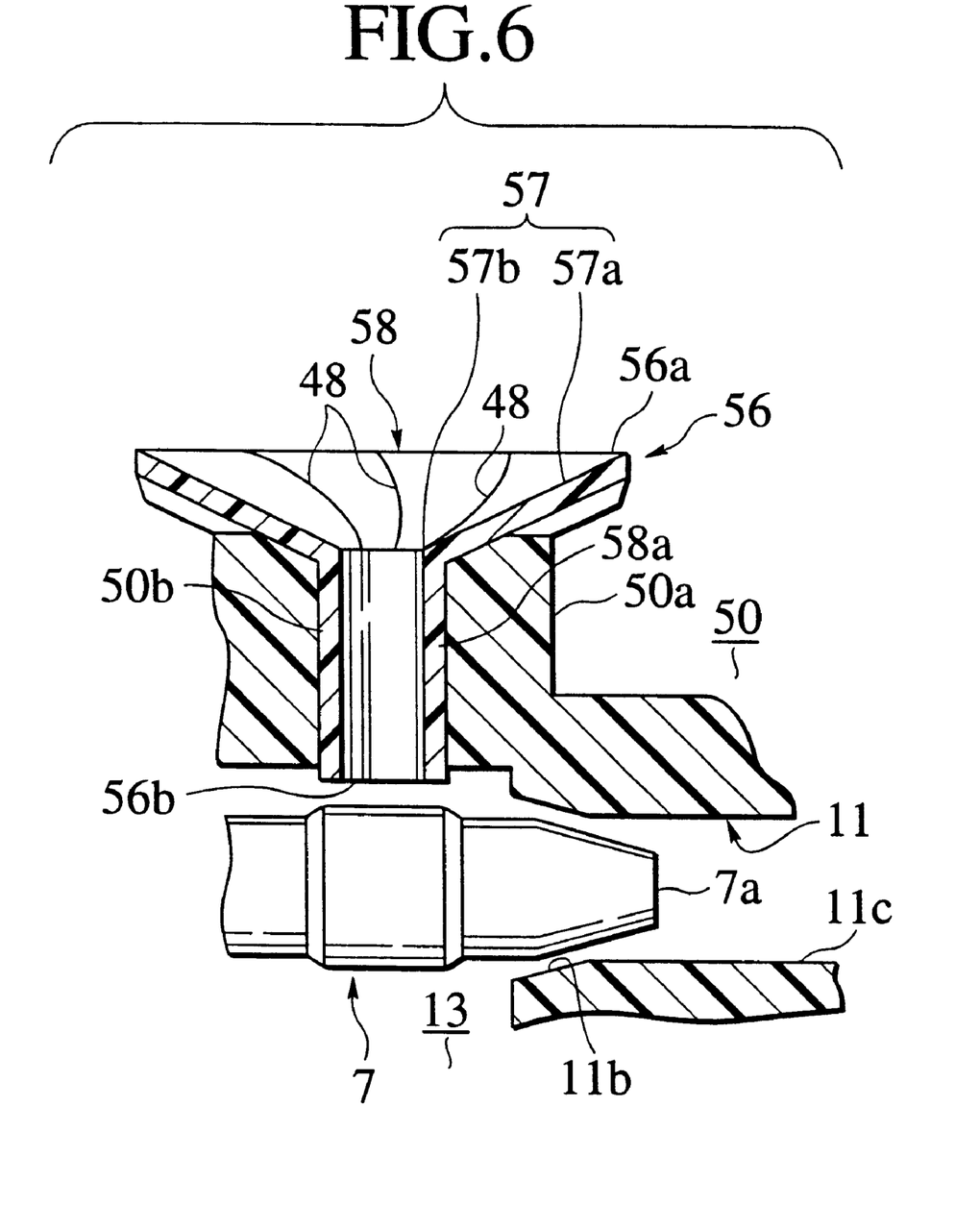
FIG. 6 is a sectional view, taken along a line VI—VI in FIG. 7, showing a configuration of the pertinent portion of a chamber structure according to a fifth embodiment of the present invention.
Figure 7:
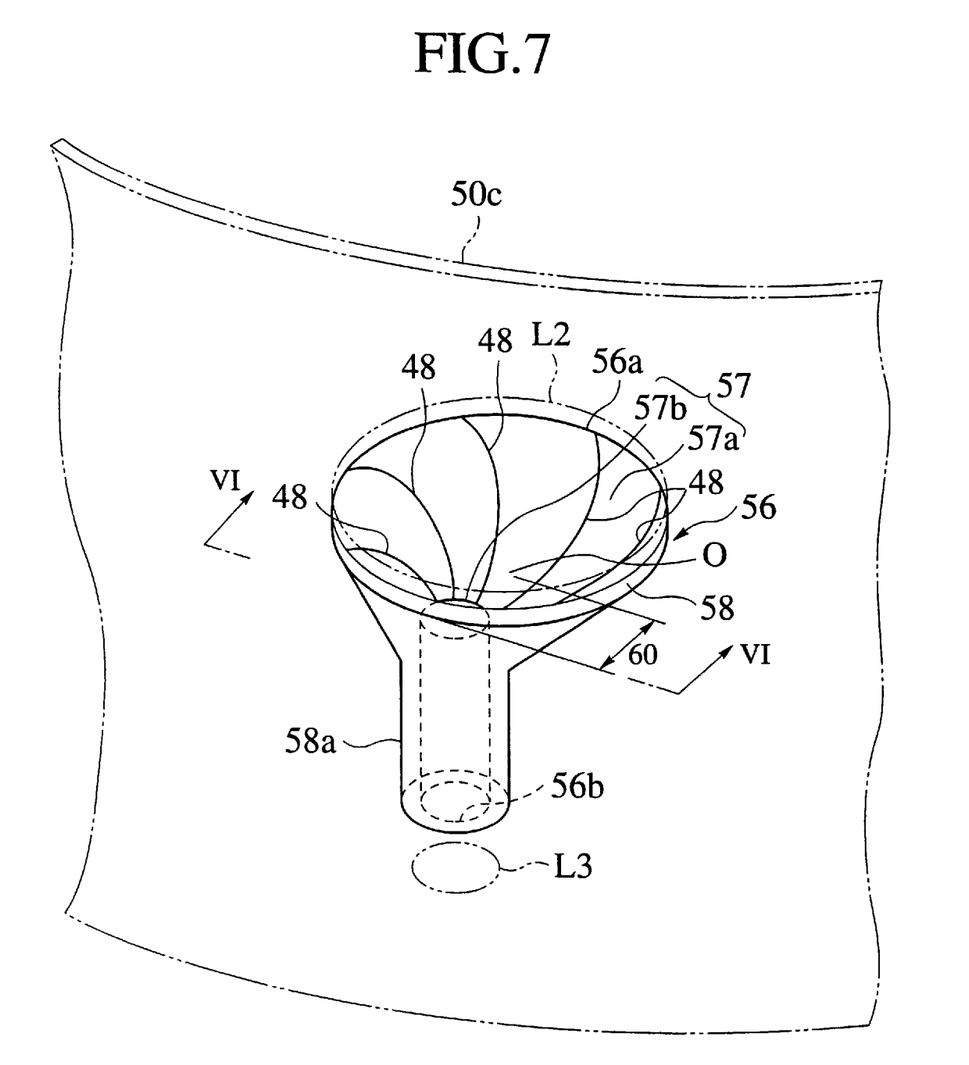
FIG. 7 is a perspective view showing a funnel-like member in the chamber structure according to he fifth embodiment of the present invention.

FIGS. 6 and 7 show the pertinent portion of a chamber structure according to a fifth embodiment of the present invention.

Same references are labeled to same or similar elements to those in the above first to fourth embodiments, and then explanation will be made hereinbelow.

A funnel-like member 58 is provided in a recirculation funnel 56 of a chamber 50. This funnel-like member 58 is formed such that its peripheral portion of an upper and opening 56a can be formed integrally with an inclined surface portion 57a as a stepped portion and also can be attached detachably to a chamber main body 50a in which the negative pressure chamber 13 is provided.

As shown in FIG. 7, the inclined surface portion 57a of the funnel-like member 58 has a funnel shape which is inclined while reducing its diameter from an upper end opening 56a which has a peripheral length L2 toward a lower end opening 56b which has & peripheral length L3.

An inlet port 57b is provided at a location which is displaced by a predetermined distance 60 from a substantial center position O of the inclined surface portion 57a toward the side wall of the chamber main body 50a. The inlet port 57b has a substantially same passage sectional are as the lower end opening 56b.

A cylinder portion 56a is provided to extend downward from the inlet port 57b. The cylinder portion 58a is inserted/fitted into a fitting hole 50b which is formed in the chamber main body 50a along the substantially vertical direction.

The chamber structure is so constructed that a part of the upper end opening 56a provided at the lower end of the cylinder portion 58a can be inserted into the negative pressure chamber 13 in the state that the funnel-like member 58 is fitted.

Next, an operation of the chamber structure according to the fifth embodiment will be explained hereinbelow.

The peripheral portion of the upper end opening 56a of the recirculated on funnel 56, which has the peripheral length L2, is formed integrally with the inclined surface portion 57a and attached detachably to the chamber main body 50a in which the negative pressure chamber 13 is formed.

Therefore, for example, even if the negative pressure chamber 13 is formed in the vicinity of the peripheral wall portion 50c of the chamber main body 50a, the peripheral length L2 of the upper end opening 56a can be assured over a total periphery since the inlet port 57b and the cylinder portion 58a extending from the inlet port 57b are formed at the location which is displaced by a predetermined distance 60 from the substantial center position O of the inclined surface portion 57a toward the side wall of the chamber main body 50a.

For this reason, a margin for formation of the upper end opening 56a can be increased regardless of the location of the negative pressure chamber 13. As a result, the peripheral length L2 of the upper end opening 56a of the recirculation funnel 56 can be easily set longer than the peripheral length L3 of the lower end opening 56b of the recirculation funnel 56 in the negative pressure chamber 13. Therefore, a predetermined flow rate of the fuel can be ensured while keeping good formability of the chamber main body 56a.

With the above, the first to fifth embodiments of the present invention have been explained in detail with reference to the drawings, but concrete configurations are not limited to the above first to fifth embodiments. Change in design, etc. without departing from the scope of this invention are contained in the present invention.

For example, in the first embodiment, the lower end opening 16b of the recirculation pipe is formed to extend near the fuel tank side through hole 12 in the negative pressure chamber 13. However, the lower end opening 16b is not limited particularly to the above. For example, the vertical passage 14a may be formed such that the lower end opening 16b can be placed below the position of the fuel tank side through hole 12.

What is claimed is:

1. A chamber structure comprising:
    a chamber main body arranged on an inner bottom of a fuel tank of a vehicle, a suction port of a fuel pump being inserted into an inside of the chamber main body;
    a first through hole formed in a peripheral wall of the chamber main body;
    a negative pressure chamber connected to the first through hole;
    a second through hole for connecting an inside of the fuel tank and the negative pressure chamber, the second through hole being arranged in a vicinity of the inner bottom of the fuel tank;
    an inlet port for passing return fuel into the inside of the chamber main body via the first through hole; and
    a recirculation funnel formed to extend upward from the negative pressure chamber, the recirculation funnel having an upper end opening directed to the inside of the chamber main body and a lower end opening directed to the negative pressure chamber, the upper end opening being positioned lower than an upper edge of the chamber main body, and a peripheral edge of the upper end opening being formed longer than that of the lower edge opening.

2. A chamber structure according to claim 1, wherein the recirculation funnel has a stepped portion for connecting an inner area of an upper end opening side to a inner area of a lower end opening side.

3. A chamber structure according to claim 2, wherein the stepped portion is arranged in a vicinity of the lower end opening.

4. A chamber structure according to claim 2, wherein the stepped portion has an inclined surface which is narrowed from the upper end opening side toward the lower end opening side.

5. A chamber structure according to claim 2, wherein the stepped portion and the peripheral edge of the upper end opening are formed integrally with each other and are attached detachably to the negative pressure chamber, and
    the stepped portion has a funnel shape which is tapered while reducing its diameter from the upper end opening side toward the lower end opening side.

6. A chamber structure according to claim 4, wherein the inclined surface has a guide portion for regulating a flow of fuel in a spiral fashion.

7. A chamber structure according to claim 1, herein a lower end opening of the recirculation funnel is arranged in the negative pressure chamber.

8. A chamber structure according to claim 1, wherein a passage sectional area of the recirculation funnel is set larger than that of the second through hole.

9. A chamber structure according to claim 1, wherein the lower end opening is arranged at a height between a passage center of the first through hole and a passage center of the second through hole.

10. A chamber structure comprising:
    a chamber main body arranged on an inner bottom of a fuel tank of a vehicle, a suction port of a fuel pump being inserted into an inside of the chamber main body;
    a first through hole formed in a peripheral wall of the chamber main body;
    a negative pressure chamber connected to the first through hole:
    a second through hole for connecting an inside of the fuel tank and the negative pressure chamber, the second through hole being arranged lower than the first through hole;
    an inlet port inserted into the first through hole, return fuel being flown from the inlet port to the inside of the chamber main body via the first through hole; and
    a recirculation funnel formed to extend upward from the negative pressure chamber, the recirculation funnel having an upper end opening directed to the inside of the chamber main body and a lower end opening directed to the negative pressure chamber, the upper end opening being positioned lower than an upper edge of the chamber main body, and a peripheral edge of the upper end opening being formed longer than that of the lower edge opening.

* * * * *